Patented Oct. 11, 1949

2,484,489

UNITED STATES PATENT OFFICE 2,484,489

3,4-DICHLOROPHENYLSULFONYL TRIBROMOMETHANE

W E Craig, Philadelphia, and William F. Hester, Drexel Hill, Pa., assignors to Rohm & Haas Company, Philadelphia, Pa., a corporation of Delaware No Drawing. Application August 7, 1947, Serial No. 767,314

1 Claim. (Cl. 260—607)

This invention concerns the chemical compound of the formula 3,4-$Cl_2C_6H_3SO_2CBr_3$. This compound has marked fungicidal properties and may be used in fungicidal compositions on plants.

A convenient method for the preparation of this new compound starts with α-3,4-dichlorophenylsulfonyl acetic acid. When this acid is converted to a salt and treated in alkaline solution with bromine or sodium hypobromite, there results a compound of the formula 3,4-$Cl_2C_6H_3SO_2CBr_3$ The reaction is carried out at temperatures between 0° and 40° C., preferably in aqueous solutions with sufficient free alkali to maintain the reaction medium on the alkaline side throughout the reaction. Two equivalents of alkali are used up by decarboxylation.

Details of a typical preparation follow.

Two hundred parts by weight of sodium hydroxide was dissolved in enough water to give four thousand parts of solution. This was cooled to 15° C., and thereto was added 315 parts of 3,4-$Cl_2C_6H_3SO_2CH_2COOH$. When this acid had dissolved, the solution was cooled to 7° C. and 384 parts of bromine slowly added with stirring and cooling of the reaction mixture, which was then allowed to stand for about sixteen hours. The mixture was then stirred for an hour at room temperature. The white solid which had formed was separated by filtration, washed twice with water, and dried at 100° C. to give 334 parts by weight of a solid melting at 170°–173° C. Recrystallization from isopropanol of this material gave a white solid melting at 172°–174° C. The analysis of the product agrees with that calculated for $Cl_2C_6H_3SO_2CBr_3$.

From the alcohol a product may be recovered in small amount corresponding in composition to 3,4-$Cl_2C_6H_3SO_2CHBr_2$ and melting at 82°–84° C.

A solution of 3,4-$Cl_2C_6H_3SO_2CBr_3$ was made in three times its volume of acetone, and the acetone solution was extended with water to ten thousand parts per million of the compound. This solution was toxic to *Macrosporium sarcinaeforme* Cav. and *Sclerotinia fructicola*, when tested by the slide germination method (cf. J. Phytopathology 33, 354). At ten-fold dilution of the above solution, the growth of Sclerotinia was still prevented.

We claim:

A compound of the formula 3,4-$Cl_2C_6H_3SO_2CBr_3$

W E CRAIG.
WILLIAM F. HESTER.

REFERENCES CITED

The following references are of record in the file of this patent:

UNITED STATES PATENTS

| Number | Name | Date |
|---|---|---|
| 2,108,606 | Miller et al. | Feb. 15, 1938 |
| 2,191,062 | Schumacher et al. | Feb. 20, 1940 |

FOREIGN PATENTS

| Number | Country | Date |
|---|---|---|
| 682,971 | Germany | Oct. 24, 1939 |